United States Patent [19]

Betts

[11] 4,215,181

[45] Jul. 29, 1980

[54] FRETTING FATIQUE INHIBITING METHOD FOR TITANIUM

[75] Inventor: Robert K. Betts, Cincinnati, Ohio

[73] Assignee: The United States of America as represented by the Secretary of the Air Force, Washington, D.C.

[21] Appl. No.: 904,847

[22] Filed: May 11, 1978

[51] Int. Cl.[2] .......... F16B 5/00; F16B 7/04

[52] U.S. Cl. .......... 428/591; 403/365; 428/588; 428/590; 428/594

[58] Field of Search .......... 403/365, 372, 368; 428/588, 590, 591, 594

[56] References Cited

U.S. PATENT DOCUMENTS

| | | | |
|---|---|---|---|
| 2,919,940 | 1/1960 | Anderson | 403/365 |
| 3;521,916 | 7/1970 | Hitt et al. | 403/365 |
| 3,979,815 | 9/1976 | Nakanose et al. | 428/591 |

*Primary Examiner*—Brooks H. Hunt
*Attorney, Agent, or Firm*—Joseph E. Rusz; William J. O'Brien

[57] ABSTRACT

A method for inhibiting the effects of fretting fatique in a pair of opposed titanium alloy mated surfaces through the use of a copper shim insert positioned between and in contact with the mated surfaces.

2 Claims, 3 Drawing Figures

| SYMBOL | SURFACE TREATMENT |
| --- | --- |
| ○ | SHOT PEENED ONLY, NON-FRETTED BASELINE |
| ■ | CR ELECTROPLATE |
| ▲ | SHIM INSERT, AL-SI-BRONZE ALLOY |
| ● | PIGMENTED COATING, ALUMINUM |
| ◆ | SURFACE HARDENED |
| ◁ | SHIM INSERT, CU ELECTROPLATED STAINLESS STEEL |
| ▷ | SHIM INSERT, CU FOIL (10-MIL) |

FRETTING FATIQUE INHIBITING METHOD FOR TITANIUM

STATEMENT OF GOVERNMENT INTEREST

The invention described herein may be manufactured and used by or for the Government for governmental purposes without the payment of any royalty thereon.

BACKGROUND OF THE INVENTION

This invention relates to a method for protecting titanium and titanium alloy elements. More particularly, this invention concerns itself with the use of copper shims for the prevention of fretting fatigue of titanium alloys.

The present interest in the use of aircraft gas turbine engines has created a need for the development of treatments which can alleviate excessive wear on engine components. Many of these components are fabricated from titanium and its alloys. Unfortunately, these alloys are susceptible to excessive wear during the periods of stress and strain encountered within the turbine engine's operational environment.

One form of wear which is especially severe is fretting. It is a form of wear indigenous to the mating surfaces of bolted flanges. In a gas turbine engine, the bolted flanges of compressor disks, or disks and stub shafts, or blade dovetail pressure faces are typical examples of potential sites for fretting fatigue. It is caused by the very small relative motion due to differential strain in the mated surfaces associated with the stresses of engine operation. Surface damage from fretting eventually creates stress raisers which, in the presence of otherwise normal and acceptable states-of-stress, can cause unexpected fatigue failure. Titanium and its alloys are naturally sensitive to surface conditioning, and their beneficial characteristics are substantially deteriorated by fretting.

With the present invention, however, it has been found that fretting fatigue in titanium and titanium alloy engine components can be minimized effectively and their fatigue life enhanced by utilizing thin copper shims placed between the mating surfaces of the titanium engine components.

SUMMARY OF THE INVENTION

In accordance with this invention, it has been discovered that copper can be used as an effective deterrent in preventing fretting fatigue in titanium and titanium base alloys. The deterrent effect of copper is accomplished by placing a thin copper shim between the mating surfaces of engine components fabricated from titanium alloys. This method is especially effective for the titanium alloys used in the manufacture of critical engine components such as fan and compressor blade dovetails, and bolted compressor disk flanges. These components are inherently susceptible to fretting fatigue induced by the stresses of engine operation.

Accordingly, the primary object of this invention is to provide a method for enhancing the fatigue life of engine components fabricated from titanium alloys.

Another object of this invention is to provide a method for inhibiting fretting fatigue of titanium alloys.

Still another object of the invention is to identify, evaluate and characterize protection treatments for alleviating the effects of wear on the fatigue life of titanium alloys used in aircraft gas turbine engines.

The above and still other objects, features and advantages of the present invention will become more readily apparent upon consideration of the following detailed description thereof when taken in conjunction with the accompanying drawings.

DESCRIPTION OF THE PREFERRED EMBODIMENT

Pursuant to the above-defined objects, it has been discovered that the insertion of thin copper metal shims, about 10 to 12 mils thick, between the mating surfaces of adjoining titanium alloy specimen components alleviates the effects of fretting wear and enhances their fatigue life. As is well known, fretting is caused by the very small relative motion due to a differential strain between the mated surfaces associated with the stresses of engine operation. For example, fretting wear and fatigue are indigenous to the mating surfaces of bolted flanges. Potential sites for such wear are found in fan and compressor blade dovetail pressure faces and compressor disk flange interfaces which are critical components of aircraft gas turbine engines.

Figure 1:
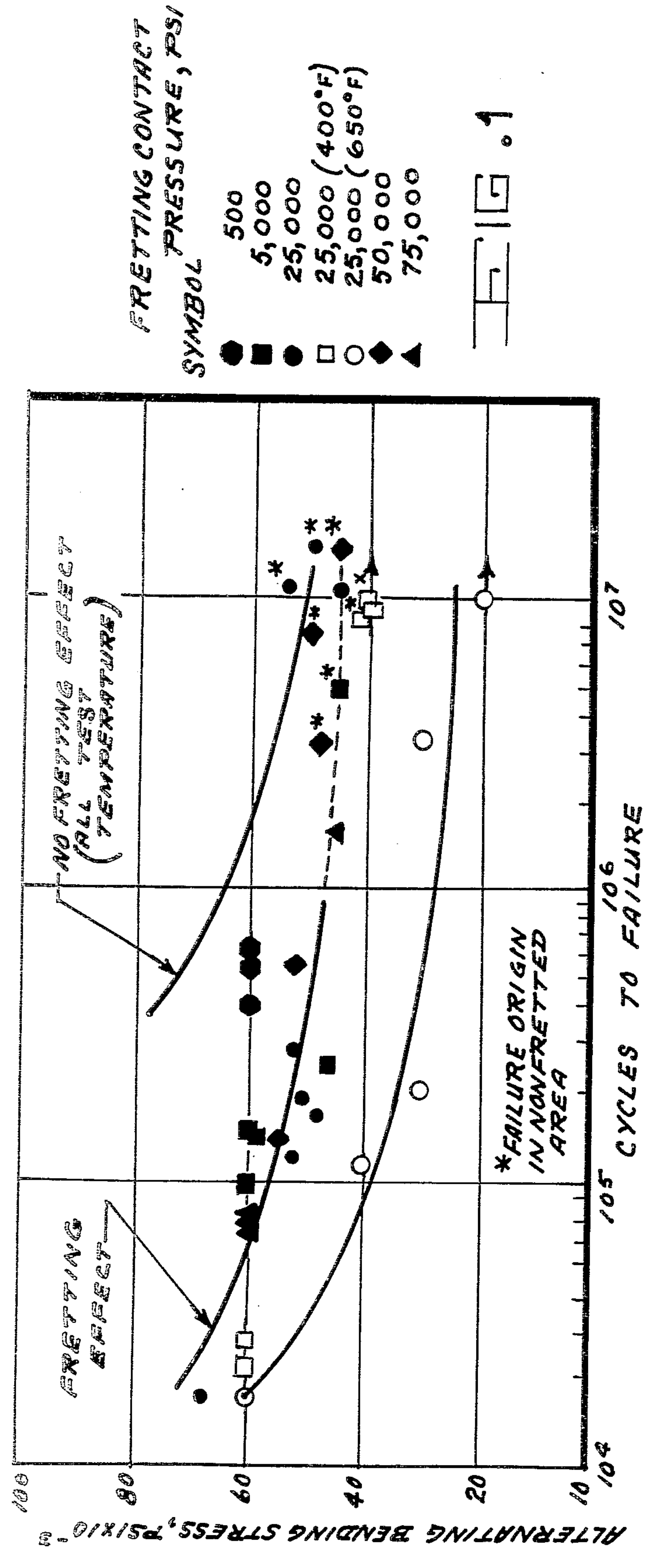
FIG. 1 represents a graphical illustration showing the effects of in-situ fretting fatigue on an unheated titanium alloy.

For purposes of illustration, FIG. 1 discloses in graphical form the effects of contact pressure and specimen temperature on the fretting fatigue of titanium. To be more specific, the effects of in-situ fretting during high cycle fatigue on an uncoated, shot-peened Ti-6Al-4V alloy are shown at room temperature, 400° F., and 650° F. with a fretting contact pressure of 500 to 75,000 PSI. The results of this test show that the baseline high cycle fatigue properties of non-fretted Ti-6Al-4V in bending with a constant mean tensile stress were unaffected by test temperature at the three levels evaluated. At room temperature, the fretted fatigue limit was the same as the non-fretted fatigue limit within the range of 40,000 to 50,000 psi bending stress. At room temperature, bending stresses above 50,000 psi and up to 70,000 psi produced classic fretting fatigue which reduced the cycles to failure by at least $1\frac{1}{2}$ orders of magnitude, except at 500 psi shoe contact pressure where the loss was only $\frac{1}{2}$ order of magnitude. At room temperature and 25,000 psi shoe contact pressure, bending stress of 60,000 psi produced inexorable fretting damage within $10^4$ to $5\times10^4$ fatigue cycles. Cracks were detectable by fluorescent penetrant, and specimens failed at the fretting-affected life of about $7\times10^4$ cycles with shoes not reapplied after inspection. At 400° F., fretting at 25,000 psi contact pressure reduced the fatigue limit by 5000–10,000 psi; furthermore, the fatigue life in the overstress region (above the endurance limit) was reduced by nearly two orders of magnitude. At 650° F., the specimen life at overstress conditions was similarly reduced, but more importantly, the fatigue limit was reduced by 20,000 psi.

Figure 2:
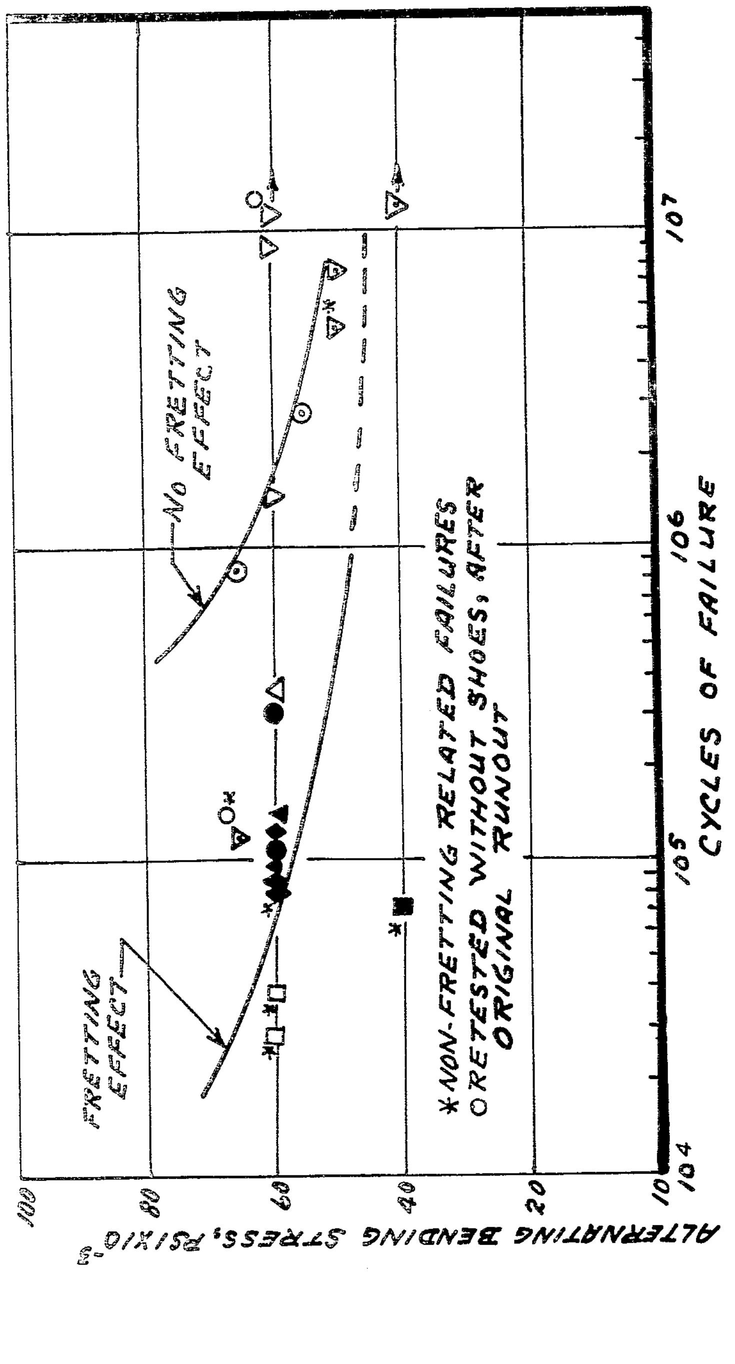
FIG. 2 represents a graphical illustration evaluating the effects of fretting fatigue on titanium alloys subjected to various surface treatments.

In light of the information obtained from the test results set forth in FIG. 1, an evaluation of wear protection treatments for fretting fatigue was undertaken. FIG. 2 discloses the results of that evaluation with the S-N curves showing the benefits obtained using a copper shim in the fretting fatigue tests. In order to show the effectiveness of this invention, tests were conducted on Ti-6Al-4V alloy fatigue specimens which simulated bolted flange interfaces. The fatigue specimens had pressure-inducing titanium shoes bolted across the gauge section of the specimen. Within this contact area, fretting was generated in-situ by an alternating bending strain motion on the specimen surface relative to the passive shoe surface.

Figure 3:
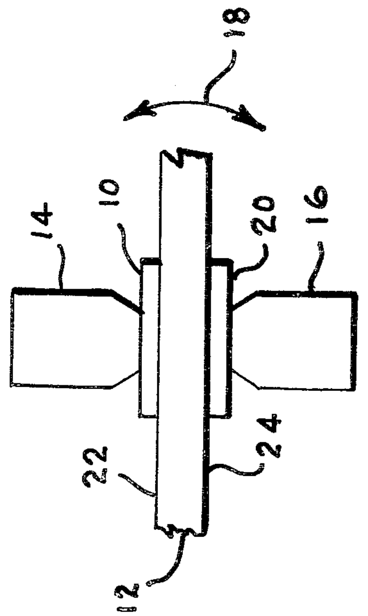
FIG. 3 represent a side elevational view, in simplified schematic form, partically fragmented, showing a testing procedure for evaluating the method of this invention.

The tests were conducted as shown in FIG. 3 on titanium alloy fatigue specimens as described above. Thin copper shims 10 and 20 were positioned between a fatigue specimen 12 and titanium fretting contact pressure shoes 14 and 16. The copper shims 10 and 20 were placed in contact with the opposing pressure faces 22 and 24 of the specimen 12 where the relative motion induced by the pressure shoes 14 and 16, as indicated by the arrow 18, was restricted to strain induced movement at the interface.

It is believed that the use of copper shims has proven to be beneficial for a number of reasons. First, the physical separation between surfaces 22 and 24 and the opposing titanium substrate surfaces of shoes 14 and 16 prevents fretting interaction. Second, by yielding elastically and perhaps plastically at lower stress than titanium, the copper interface moves with the titanium strain motion rather than resisting it. This minimizes relative motion and reduces the propensity for fretting type wear. Third, copper oxide forms as a result of fretting attrition which may occur, and the oxide seems to further mitigate damage to the titanium specimen 12 by acting as a dry lubricant.

For purposes of simplification, the bolting arrangement utilized to position the shoes 14 and 16 is not shown in FIG. 3. The copper shims 10 and 20 are inserted in the same manner as a gasket and can be configured to suit the geometry of the joint area to be protected. The shims 10 and 20 should be as thin as possible, preferably 10 to 12 mils thick, to achieve protection without altering the joint function. The addition of alloying elements to the copper may be resorted to in order to strength it and improve its temperature capability.

With reference again to FIG. 2, the following surface protection treatments were selected to be fretting fatigue tested in order to provide comparative results with those obtained by using a plain copper shim; chromium electroplate, aluminum pigmented baked on coating, a cyaniding salt-bath surface hardening treatment, a shim insert of an aluminum-silicon-bronze alloy, and a copper electroplated stainless steel shim insert. Results of the comparative tests of FIG. 2 for the various surface treatments tested at room temperature are summarized in Table I. The fatigue data are also plotted in FIG. 2 against baseline curves from FIG. 1.

TABLE I

RESULTS OF ROOM TEMPERATURE FRETTING FATIGUE TESTS OF PROSPECTIVE TREATMENTS ON Ti-6Al-4V

| Surface Treatment | HCF Bending, Ksi | Static Axial Stress, Ksi | Shoe Contact Pressure, Ksi | Cycles to Failure | Failure Location |
|---|---|---|---|---|---|
| Series 1 - High Stress Fretting Fatigue of Candidate Protection Treatments | | | | | |
| Baseline | | | | | |
| 1 | 66 | 20 | no shoes | 717,000 | Corner (radiused edge of specimen) |
| 2 | 55 | 20 | no shoes | 2,677,000 | |
| Chromium electroplate | | | | | |
| 3 | 60 | 20 | 25 | 36,000 | Away from shoe contact area |
| 4 | 40 | 20 | 25 | 71,000 | Away from shoe contact area |
| 5 | 60 | 20 | 25 | 28,000 | Along and away from shoe contact area |
| Al-Bronze Shim | | | | | |
| 6 | 60 | 20 | 25 | 128,000 | Center edge of fretted band |
| 7 | 60 | 20 | 25 | 94,000 | Center edge of fretted band |
| Aluminum pigmented coating | | | | | |
| 8 | 60 | 20 | 25 | 273,000 | Center edge of fretted band |
| 9 | 60 | 20 | 25 | 113,000 | Center edge of fretted band |
| Surface Hardening | | | | | |
| 10 | 60 | 20 | 25 | 118,000 | Center edge of fretted band |
| 11 | 60 | 20 | 25 | 87,000 | Center edge of fretted band |
| 12, with Cu Cu electro-plated shim | 60 | 20 | 25 | 85,000 | Away from shoe contact area |
| Cu Electroplated Shim | | | | | |
| 13 | 60 | 20 | 25 | 343,000 | Center edge of fretted band |
| Cu Foil Shim, 10 mils | | | | | |
| 14 | 60 | 20 | 25 | 1,566,000 | Along edge of shoe contact area |
| 15 | 60 | 20 | 25 | $10^7$RO | Run-out, see retest 17 R. |
| 16 | 66 | 20 | no shoes | 127,000 | Specimen edge, not in fretted area |
| 17 | 60 | 20 | 25 | 9,080,000 | Center edge of fretted area |
| Series 2 - Lower-Stress Confirmation of Fretting Protection | | | | | |
| Cu Foil Shim | | | | | |
| 18 | 50 | 20 | 25 | 5,100,000 | Center, sub-surface near fretter area |
| 19 | 50 | 20 | 25 | 7,564,000 | Center edge of fretted area |

TABLE I-continued

| RESULTS OF ROOM TEMPERATURE FRETTING FATIGUE TESTS OF PROSPECTIVE TREATMENTS ON Ti-6Al-4V | | | | | |
|---|---|---|---|---|---|
| Surface Treatment | HCF Bending, Ksi | Static Axial Stress, Ksi | Shoe Contact Pressure, Ksi | Cycles to Failure | Failure Location |
| 20 | 40 | 20 | 25 | 12,352,000 | Run-out |

The Al-bronze alloy shim did not prevent fretting fatigue of the Ti-6Al-4V. The fatigue life of the specimen was essentially the same as that for bare Ti fretting fatigue.

The aluminum pigmented coating in one instance extended the fretting fatigue life. However, examination of it and a short-lived specimen showed that the coating was disintegrated by the fretting and that the debris caused fretting damage to the substrate. The one extended life data point relates to a slightly thicker coating providing more protection before it deteriorated. Although the titanium substrate surfaces of the specimen and bolted on shoes were kept separated by the coating, it was observed that fretting debris generated along the edges of shoe contact abraded the titanium substrate, affected the surface integrity, and led to premature failure. Accumulated fretting debris exhibited a platelet structure and, also, a wave-like structure similar to that observed for the Al-bronze shim.

The surface hardened specimens did not show improved fretting fatigue life. One of the specimens failed at an origin that was clearly remote from the shoe contact areas, indicating a possible effect on fatigue due to the process.

Metallographic sections of a speciment revealed that the titanium surface was very brittle. It showed an incipient fracture site under a shoe contact edge. Multiple fractures were present and formed blocky chunks of titanium beneath the surface. The initiation of the crack was from a surface tear that characteristically curved in and under the shoe contact area. This tear, which initiated from contact fatigue, served as a site from which the fracture then propagated nearly perpendicular to the specimen surface.

Each of the three chromium electroplated specimens failed prematurely with respect to the fretting effect curve. One specimen failed in less that $10^5$ cycles at a reduced alternating stress value where a $10^7$ runout would be expected for shot peened titanium with or without fretting shoes. The fatigue properties of this group of specimens very obviously were degraded in respect to the test conditions. The plated coating was interlaced with cracks, and at a failure site the fracture and surface cracks appeared to interconnect. Also, isolated sites of fretting occurred on high spots of the chromium plate. Structurally, the coating consisted of two layers, not clearly discernable, except that slight imperfections showed along the interface and most of the surface cracks penetrated only the outer layer. An interdiffusion zone existed between the chromium layer and the Ti-6Al-4V substrate. An incipient fracture crack extended from the surface into the substrate. The actual fracture edge no doubt originated from a similar crack propagation. The titanium appeared as a normal $\alpha$-$\beta$ structure, indicating no transformation associated with the chemical process. The substrate did not exhibit any hardness gradient. The coating included a steep hardness differential.

When the lack of fretting fatigue protection became obvious from the test results set forth in Table I, it was felt that electroplated copper shims should be evaluated. Previous results in a testing program had demonstrated results that copper plated onto titanium by a combination of ion plating and electroplating provided suitable fretting protection, at other stress conditions. Residual specimens from that program were those subsequently used in sliding wear tests against uncoated titanium shoe surfaces and found to have excellent anti galling characteristics. Copper electroplated onto 316 stainless steel strip had also been prepared for tests. It was recommended that the shims be used as a preliminary trial. The copper electroplated shim did inhibit fretting but did not provide complete protection. The contact area was very similar to that shown previously for the Al-bronze shim with only very superficial surface effects. It was interpreted that the thin copper plating had worn away and that fretting was induced from the presumed exposed steel core. This was not the case. Fretting fatigue originated from the same mechanism as with the other treatments, mild surface wear damage and contact fatigue.

In order to provide a copper interface with more cushion effect, that is to absorb strain motion by elastic deformation, a 10–12 mil plain copper shim was substituted for the plated shim. This method proved very successful, effectively inhibiting overstress fretting fatigue of the Ti-6Al-4V at room temperature.

Scanning electron microscope evaluation revealed that the surfaces of the titanium were coated with debris. One view showed a nearly continuing debris film and another view where the film was partially flaked off, revealed the shot peened surface texture of the substrate. SEM analysis showed the debris to be copper with no detectable trace of titanium. Dissolving away the debris revealed no substrate surface damage.

The copper shims were observed to fret sacrificially forming a protective layer of copper debris. This layer accommodated the strain motion, probably redistributed the contact-forces, did not itself abrade the Ti-6Al-4V substrate, and was sufficiently cohesive to be retained within the interface for the duration of the tests. The shims adhered to the mating surfaces to the extent that they had to be torn off, (similar to engine gaskets) giving the impression of greater deterioration than actually existed when they were confined to the interface.

It had been found in prior testing of uncoated shot peened Ti-6Al-4V that fretting at 650° F. drastically increased the severity of fretting, to the extent that the runout stress was reduced approximately 50%. Fretting fatigue tests were performed with the copper shim inserts at 650° F. to evaluate the effectiveness in that severe fretting regime. These test data are contained in Table II and were shown previously in FIG. 2.

TABLE II

RESULTS OF 650° F. FRETTING FATIGUE TESTS OF SHOT PEENED Ti-6Al-4V WITH Cu SHIM INSERTS

| Specimen No. | HCF Bending Stress ksi | Static Stress ksi | Shoe Contact Pressure, ksi | Cycles to Failure | Failure Location |
|---|---|---|---|---|---|
| 1 | 40 | 20 | 25 | 10,001,000 | Specimen edge, not in fretted area |
| 2 | 40 | 20 | 25 | 3,754,000 | Near Shoe Edge* |
| 3 | 40 | 20 | 25 | 8,330,000 | Center edge of fretted area* |
| 4 | 40 | 20 | 25 | 11,468,000 | Run out |

*Tension pull bar broke during these tests. Specimens failed after re-start. Test results not plotted.

The copper shims again inhibited fretting of the Ti-6Al-4V substrates. The appearance of the specimens were similar to those previously shown except for the presence of oxide discoloration. There was no evidence of surface pitting such as occurred with uncoated titanium.

From a consideration of the foregoing, it can be seen that the use of copper shim inserts provides an effective method for inhibiting the effects of fretting fatigue in titanium alloys. The copper shim is inserted between the mating surfaces of opposed titanium or titanium alloy substrates and affords fretting fatigue protection by accommodating the relative strain motion of the titanium substrate. The elastic and plastic deformation within the shim insert probably accounts for inhibiting the classic fretting mechanisms which produce the pits and concentration of debris that act as stress raisers.

While the principles of this invention have been described with particularity, it should be understood that various alterations and modifications can be made without departing from the spirit of the invention, the scope of which is defined by the appended claims.

What is claimed is:

1. A pair of relatively movable titanium-base alloy members having pressure face surfaces in opposed relationship, and a copper shim insert positioned between and in contact with said pressure face surfaces thereby inhibiting the effects of fretting fatigue caused by the differential strain occurring in said surfaces during movement of said relatively movable members.

2. A method for inhibiting the effects of fretting fatigue in titanium-base metal membranes which comprises the steps of interdisposing a copper shim insert between and in contact with the mating surfaces of a pair of opposed titanium-base metal members.

* * * * *